US009965119B2

(12) United States Patent
Lee et al.

(10) Patent No.: US 9,965,119 B2
(45) Date of Patent: May 8, 2018

(54) HIGH-SENSITIVITY SELF-CAPACITANCE IN-CELL TOUCH DISPLAY PANEL DEVICE

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 61 days.

(21) Appl. No.: 14/932,496

(22) Filed: Nov. 4, 2015

(65) Prior Publication Data

US 2016/0132154 A1 May 12, 2016

(30) Foreign Application Priority Data

Nov. 7, 2014 (TW) .............................. 103138723 A

(51) Int. Cl.
*G09G 3/36* (2006.01)
*G06F 3/044* (2006.01)
*G02F 1/1333* (2006.01)
*G06F 3/041* (2006.01)

(52) U.S. Cl.
CPC .......... *G06F 3/044* (2013.01); *G02F 1/13338* (2013.01); *G06F 3/0412* (2013.01); *G06F 3/0416* (2013.01); *G09G 3/3611* (2013.01); *G06F 2203/04103* (2013.01); *G06F 2203/04107* (2013.01); *G06F 2203/04112* (2013.01)

(58) Field of Classification Search
CPC ..... G09G 3/3611; G06F 3/0412; G06F 3/041; G06F 3/0416; G06F 3/044; G02F 1/13338
USPC ..................................... 345/173–174; 349/12
See application file for complete search history.

(56) References Cited

U.S. PATENT DOCUMENTS

| 2012/0249454 | A1* | 10/2012 | Teraguchi | G06F 3/0412 |
| | | | | 345/173 |
| 2013/0242211 | A1* | 9/2013 | Lee | G02F 1/13338 |
| | | | | 349/12 |
| 2013/0285952 | A1* | 10/2013 | Huang | G09G 3/3611 |
| | | | | 345/173 |
| 2013/0285966 | A1* | 10/2013 | Kimura | G06F 3/0412 |
| | | | | 345/173 |
| 2013/0314371 | A1 | 11/2013 | Lee | |

(Continued)

*Primary Examiner* — Abdul-Samad A Adediran
(74) *Attorney, Agent, or Firm* — Muncy, Geissler, Olds & Lowe, P.C.

(57) ABSTRACT

A high-sensitivity self-capacitance in-cell touch display panel device includes a sensing electrode layer having plural sensing electrodes, a display control circuit, a touch sensing control circuit, and an amplifier with gain greater than zero. The display control circuit is powered by a first power source and connected to a first ground. The touch sensing control circuit is coupled to the sensing electrodes for performing a touch sensing. The touch sensing control circuit is powered by a second power source and connected to a second ground, wherein the first power source and the first ground are different from the second power source and the second ground. The amplifier is connected to the touch sensing control circuit and a common voltage layer. The touch sensing control circuit applies a sensing signal sensed by at least one sensing electrode to the amplifier for being amplified and applied to the common voltage layer.

29 Claims, 13 Drawing Sheets

(56) References Cited

U.S. PATENT DOCUMENTS

| | | | |
|---|---|---|---|
| 2013/0328824 A1* | 12/2013 | Krah | G06F 3/041 |
| | | | 345/174 |
| 2014/0118289 A1* | 5/2014 | Lipasti | G06F 3/0416 |
| | | | 345/174 |
| 2014/0192275 A1 | 7/2014 | Lee | |
| 2014/0326967 A1 | 11/2014 | Lee | |
| 2014/0346493 A1 | 11/2014 | Lee | |
| 2014/0353691 A1 | 12/2014 | Lee | |
| 2014/0375911 A1 | 12/2014 | Lee | |
| 2015/0009174 A1* | 1/2015 | Huang | G06F 3/044 |
| | | | 345/174 |
| 2015/0049264 A1 | 2/2015 | Lee | |
| 2015/0054752 A1* | 2/2015 | Mackey | G06F 3/0416 |
| | | | 345/173 |
| 2015/0085208 A1 | 3/2015 | Lee | |

\* cited by examiner

HIGH-SENSITIVITY SELF-CAPACITANCE IN-CELL TOUCH DISPLAY PANEL DEVICE

BACKGROUND OF THE INVENTION

1. Field of the Invention

The present invention relates to the technical field of touch panels and, more particularly, to a high-sensitivity self-capacitance in-cell touch display panel device.

2. Description of Related Art

The conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well known skill of the touch panel may increase additional weight and thickness of the touch display panel, and may further reduce the light penetration rate, and increase reflectance and haze of the touch display panel.

On-cell and in-cell touch technology were invented to overcome the drawbacks of traditional touch technology described above. The on-cell technology is to dispose a sensor on the back side of a color filter substrate to form a completed color filter substrate. One of the on-cell touch technologies is provided to dispose a touch sensor on a thin film and then bond the thin film onto the upper one of the two substrates. The in-cell technology is to dispose the sensor within the LCD cell structure. However, when the sensor is disposed within the LCD cell structure, the distance between the sensor and the common voltage layer is only several micro meters and thus the capacitance induced therebetween is greatly increased, such that, in comparison with such a large capacitance, the capacitance change caused by touch is too small to be detected. Furthermore, because of the short distance, the display signal may be seriously interfered, resulting in a had display quality.

FIG. 1 schematically illustrates the transparent electrode structure of a single-layer touch panel. As shown, there are a plurality of transparent electrodes 11 arranged in rows and columns, and the electrical signal sensed by one transparent electrode 11 is transmitted through a corresponding conductive wire 12 for output. Such a single-layer transparent electrode structure can realize an actual multi-touch detection. In use, the single-layer transparent electrode structure of FIG. 1 is combined with a display panel. However, when the single-layer transparent electrode structure is integrated with the display panel, there will be an obvious capacitance produced between the single-layer transparent electrode structure and a common voltage layer of the display panel, which may cause noises to be produced and thus lower the accuracy in detection the touch position. In order to solve the aforementioned problems for the in-cell touch panel, a direct solution is to partition the common voltage layer into several blocks for being operated with the display control in a time sharing manner, which not only restricts the resolution and size of the touch screen but also negatively influences the display quality and greatly increases the difficulties in designing and trimming of the display control circuit and manufacture of the panel, resulting in low production yield and high manufacturing cost. Therefore, it desired for the aforementioned in-cell touch display panel structure to be improved.

SUMMARY OF THE INVENTION

The object of the present invention is to provide a high-sensitivity self-capacitance in-cell touch display panel device, which can effectively reduce the capacitance effect generated between the sensing electrode and the common voltage layer without interfering the display signal, so that the touch sensing and the display driving are not required to operate in a time-sharing manner. Therefore, the size of the in-cell touch panel is no longer restricted and the sensing and production difficulty is lowered, so as to not only easily and accurately detect the finger's touch but also reduce the manufacturing cost.

In one aspect of the present invention, there is provided high-sensitivity self-capacitance touch display panel device, which comprises: a first substrate; a second substrate parallel to the first substrate; a display material layer configured between the first substrate and the second substrate; to common voltage layer disposed between the first substrate and the display material layer; a sensing electrode layer disposed between the first substrate and the common voltage layer, and having plurality of sensing electrodes; a plurality of sensing electrode selection switches, each corresponding to at least one sensing electrode; a display control circuit for controlling the high-sensitivity self-capacitance in-cell touch display panel device to display image, wherein the display control circuit is powered by a first power source and is connected to a first ground; a touch sensing control circuit connected to the plurality of sensing electrode selection switches for controlling the at least one sensing electrode corresponding to each sensing electrode selection switch so as to perform a touch sensing, wherein the touch sensing control circuit is powered by a second power source and is connected to a second ground; and an amplifier with gain greater than zero connected to the touch sensing control circuit and the common voltage layer, wherein the first power source and the first ground are different from the second power source and the second ground and, in detection, the touch sensing control circuit applies a sensing signal sensed by the at least one sensing electrode corresponding to a sensing electrode selection switch to the amplifier with gain greater than zero for being amplified so as to generate an in-phase copied sensing signal that is applied to the common voltage layer, thereby reducing the capacitance effect between the common voltage layer and the at least one sensing electrode corresponding to the sensing electrode selection switch.

In another aspect of the present invention, there is provided a high-sensitivity self-capacitance in-cell touch display panel device, which comprises: a first substrate; a common voltage layer; a second substrate parallel to the first substrate; a display material layer configured between the first substrate and the second substrate; a plurality of sensing electrodes, each formed by metal mesh; a plurality of sensing electrode selection switches, each corresponding to at least one sensing electrode; a display control circuit for controlling the high-sensitivity self-capacitance in-cell touch display panel device to display image, wherein the display control circuit is powered by a first power source and is connected to a first ground; a touch sensing control circuit connected to the plurality of sensing electrode selection switches for controlling the at least one sensing electrode corresponding to each sensing electrode selection switch so as to perform a touch sensing, wherein the touch sensing control circuit is powered by a second power source and is connected to a second ground; and an amplifier with gain greater than zero connected to the touch sensing control circuit and the common voltage layer, wherein the first power source and the first ground are different from the second power source and the second ground and, in detection, the touch sensing control circuit applies a sensing signal sensed by the at least one sensing electrode corresponding to a sensing electrode selection switch to the amplifier with gain greater than zero for being amplified so as to generate an in-phase copied sensing signal that is applied to the common voltage layer, thereby reducing the capacitance effect between the common voltage layer and the at least one sensing electrode corresponding to the sensing electrode selection switch.

In still another aspect of the present invention, there is provided a high-sensitivity self-capacitance in-cell touch display panel device, which comprises: a first substrate; a second substrate parallel to the first substrate; a display material layer configured between the first substrate and the second substrate; a cathode layer disposed at one side of the first substrate facing the display material layer; a sensing electrode layer disposed between the first substrate and the second substrate, and having a plurality of sensing electrodes; a plurality of sensing electrode selection switches, each corresponding to at least one sensing electrode; a display control circuit for controlling the high-sensitivity self-capacitance in-cell touch display panel device to display image, wherein the display control circuit is powered by a first power source and is connected to a first ground; a touch sensing control circuit connected to the plurality of sensing electrode selection switches for controlling the at least one sensing electrode corresponding to each sensing electrode selection switch so as to perform a touch sensing, wherein the touch sensing control circuit is powered by a second power source and is connected to a second ground; and an amplifier with gain greater than zero connected to the touch sensing control circuit and the cathode layer, wherein the first power source and the first ground are different from the second power source and the second ground and, in detection, the touch sensing control circuit applies a sensing signal sensed by the at least one sensing electrode corresponding to a sensing electrode selection switch to the amplifier with gain greater than zero for being amplified so as to generate an in-phase copied sensing signal that is applied to the cathode layer, thereby reducing the capacitance effect between the cathode layer and the at least one sensing electrode corresponding to the sensing electrode selection switch.

In yet another aspect of the present invention, there is provided a high-sensitivity self-capacitance in-cell touch display panel device, which comprises: a first substrate; a second substrate parallel to the first substrate; a display material layer configured between the first substrate and the second substrate; an anode layer disposed at one side of the first substrate facing the display material; a sensing; electrode layer disposed between the first substrate and the second substrate, and having a plurality of sensing electrodes; a plurality of sensing electrode selection switches, each corresponding to at least one sensing electrode; a display control circuit for controlling the high-sensitivity self-capacitance in-cell touch display panel device to display image, wherein the display control circuit is powered by a first power source and is connected to a first ground; a touch sensing control circuit connected to the plurality of sensing electrode selection switches for controlling the at least one sensing electrode corresponding to each sensing electrode selection switch so as to perform a touch sensing, wherein the touch sensing control circuit is powered by a second power source and is connected to a second ground and an amplifier with gain greater than zero connected to the touch sensing control circuit and the anode layer, wherein the first power source and the first ground are different from the second power source and the second ground and, in detection, the touch sensing control circuit applies a sensing signal sensed by the at least one sensing electrode corresponding to a sensing electrode selection switch to the amplifier with gain greater than zero for being amplified so as to generate an in-phase copied sensing signal that is applied to the anode layer, thereby reducing the capacitance effect between the anode layer and the at least one sensing electrode corresponding to the sensing electrode selection switch.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
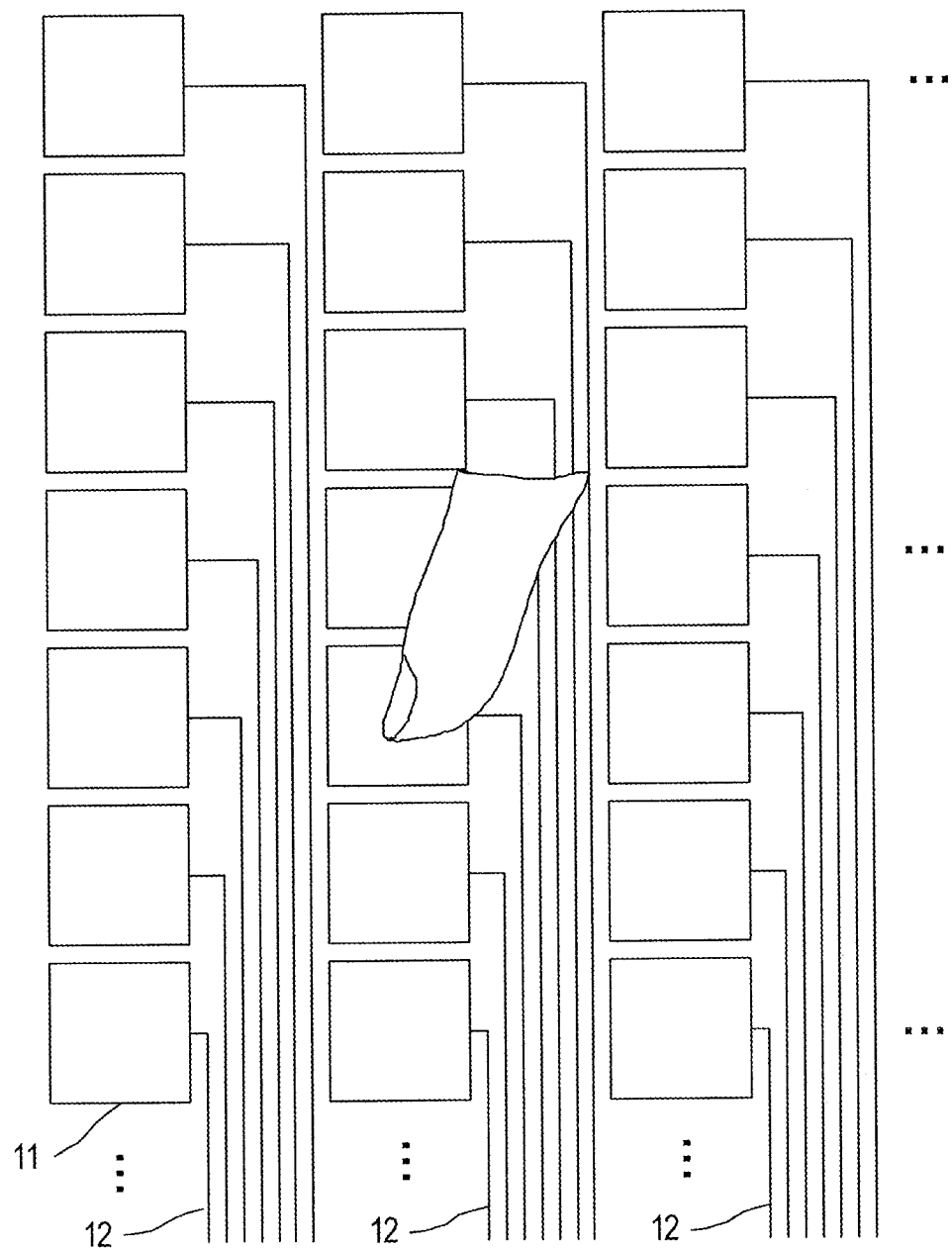
FIG. 1 schematically illustrates a transparent electrode structure of single-layer touch panel in the prior art.
Figure 2:
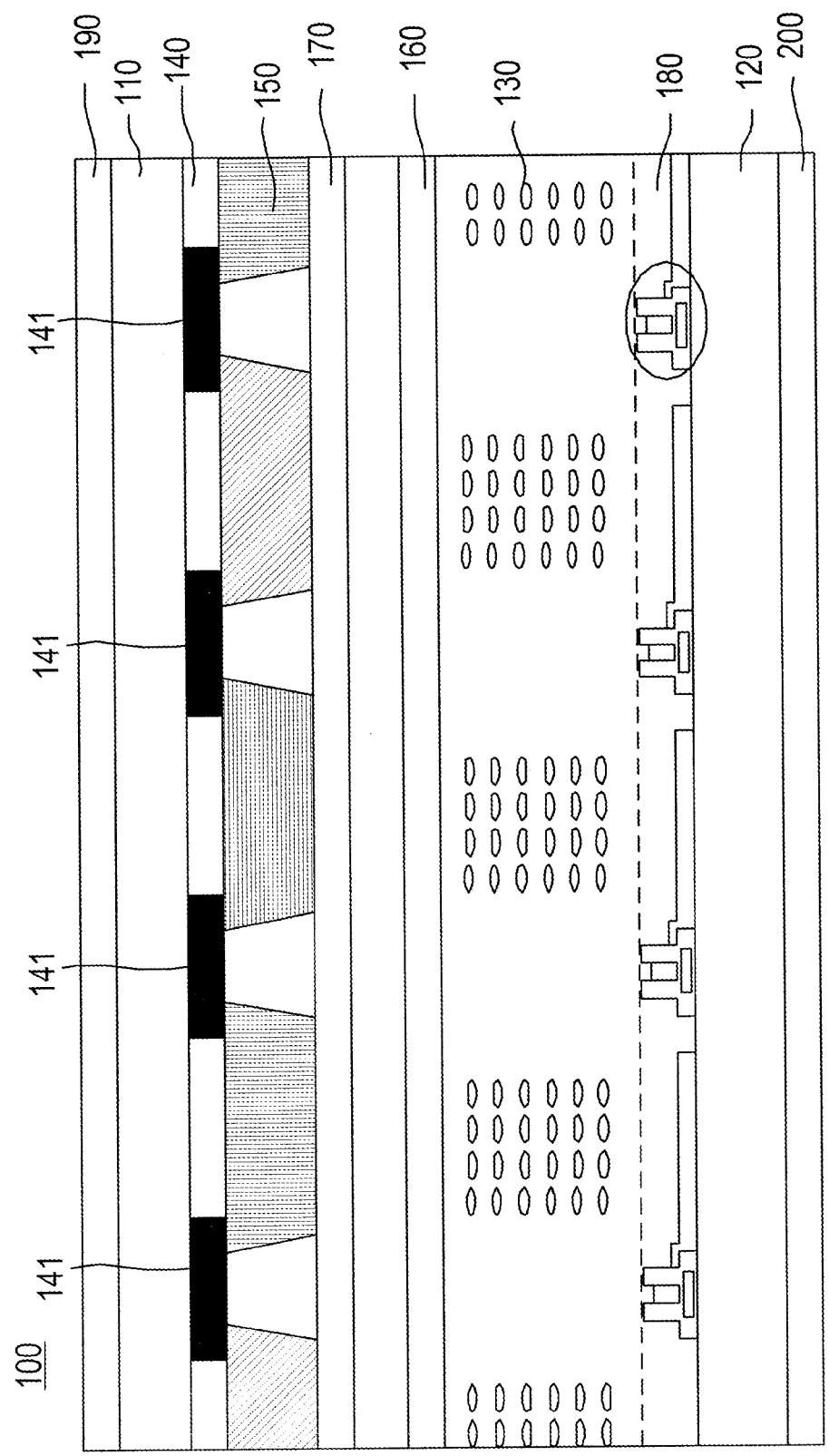
FIG. 2 shows a high-sensitivity self-capacitance in-cell touch display panel device in accordance with one embodiment of the present invention.

With reference to FIG. 2, there is shown a high-sensitivity self-capacitance in-cell touch display panel device in accordance with one embodiment of the present invention. As shown, the high-sensitivity self-capacitance in-cell touch display panel device 100 includes a first substrate 110, a second substrate 120, a display material layer 130, a black matrix layer 140, a color filter layer 150, a common voltage (Vcom) layer 160, a sensing electrode layer 170, a thin film transistor layer 180, a first polarizer layer 190, and a second polarizer layer 200.

The first substrate 110 and the second substrate 120 are preferably glass substrates, and are parallel to each other. The display material layer 130 is disposed between the first and second substrates 110, 120. In this embodiment, the display material layer 130 is preferably a liquid crystal layer.

Figure 3:
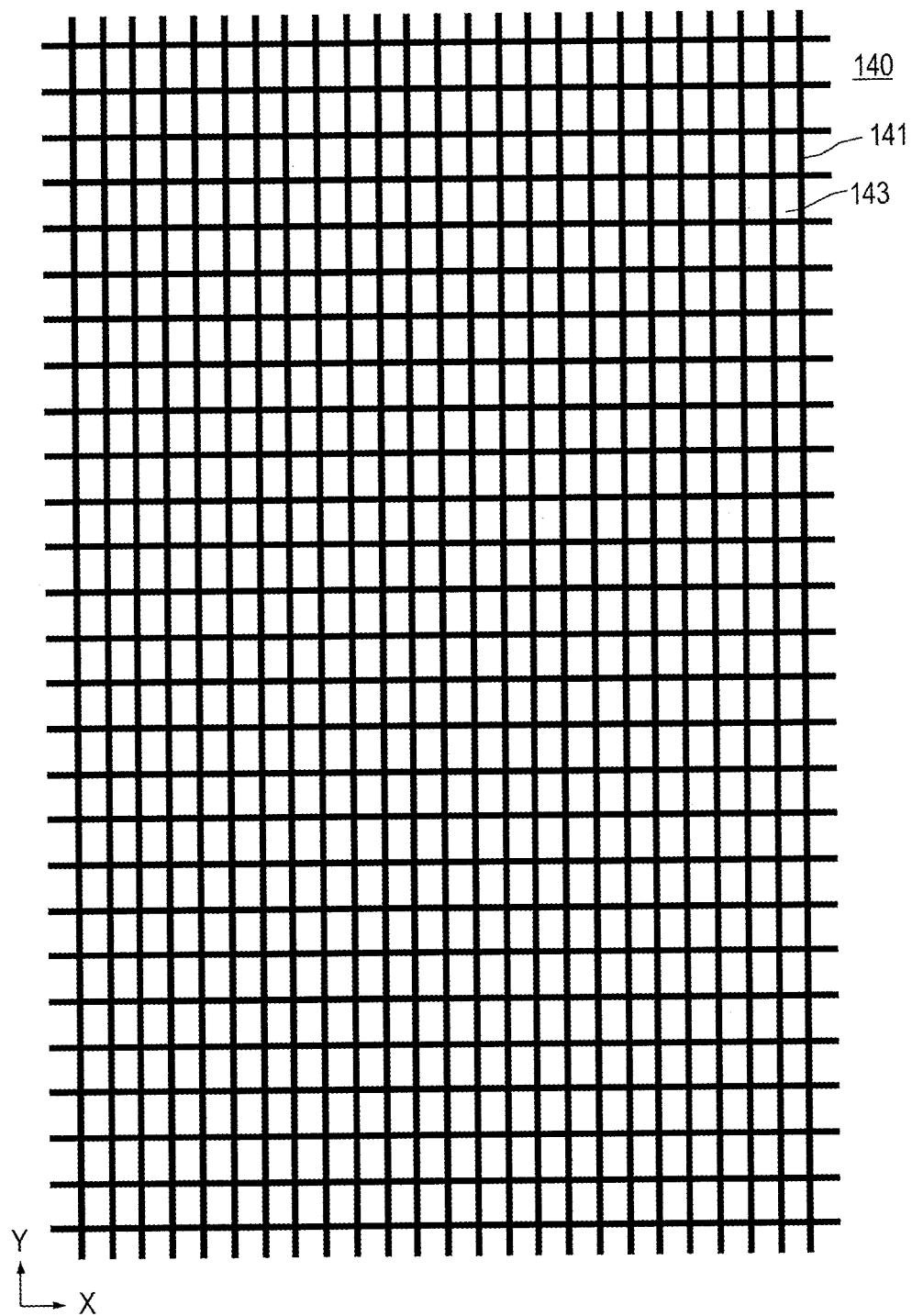
FIG. 3 shows the black matrix layer in accordance with the present invention.

The black matrix layer 140 is between the first substrate 110 and the display material layer 130 and is disposed at one side of the first substrate 110 that faces the display material layer 130. As shown in FIG. 3, the black matrix layer 140 is composed of a plurality of opaque lines 141 arranged in a first direction (X-axis direction) and a second direction (Y-axis direction) for defining a plurality of light-penetrating blocks 143, wherein the first direction is substantially perpendicular to the second direction.

FIG. 3 schematically illustrates the black matrix layer 140, which is the same as that of the prior LCD panel. As shown, the black matrix layer 140 is composed of a plurality of opaque lines 141 of insulating material that are black and opaque. The plurality of lines 141 of black insulating material are arranged as a checkerboard pattern in which the plurality of light-penetrating blocks 143 are defined. The plurality of opaque lines 141 are disposed at positions corresponding to those of gate lines and source lines of the thin film transistor layer 180, wherein the gate lines and source lines are well-known to those skilled in the art of LCD device and thus are not drawn in the figures.

Figure 4:
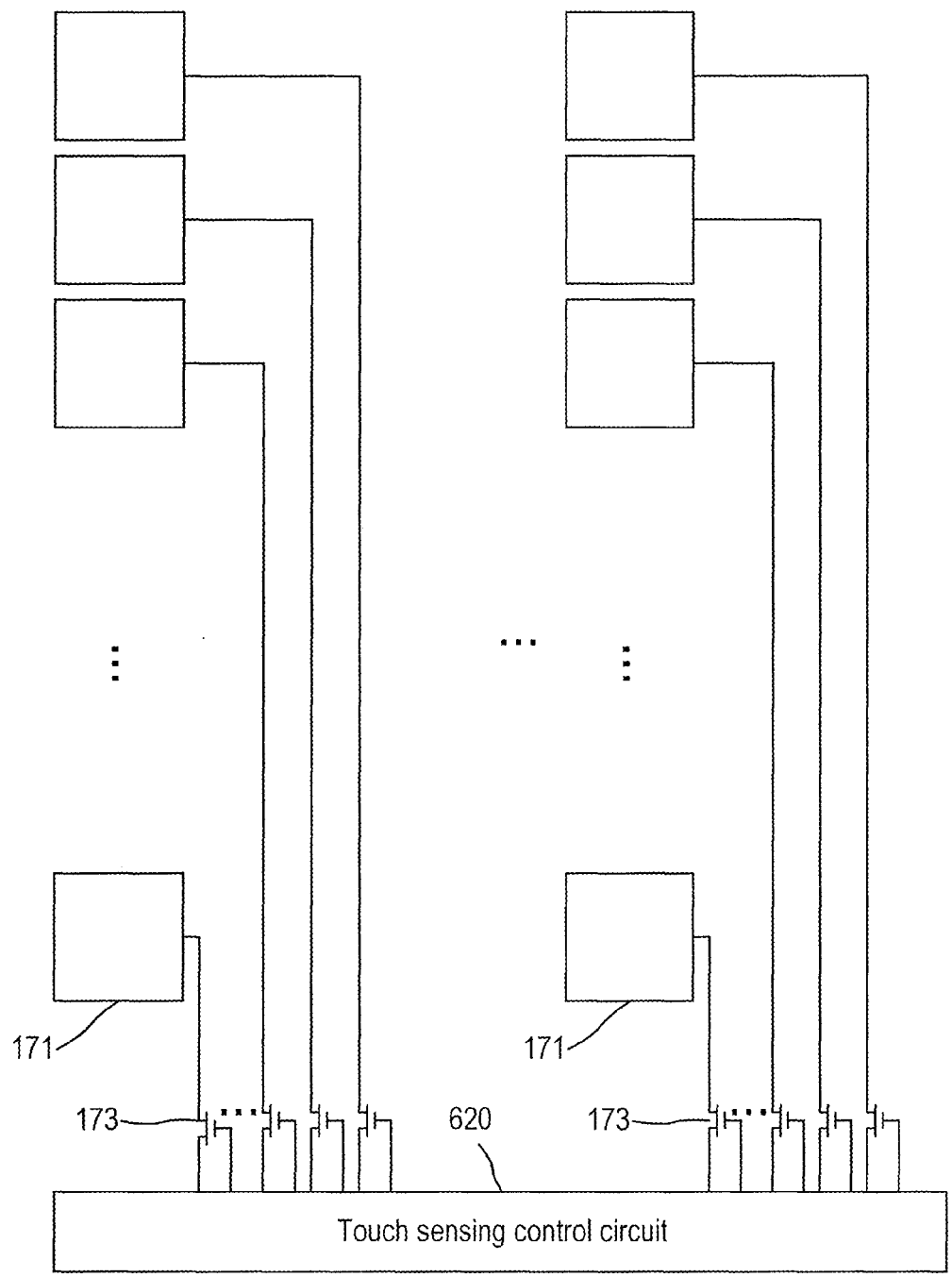
FIG. 4 is a schematic view of the sensing electrode layer in accordance with the present invention.

FIG. 4 is a schematic view of the sensing electrode layer in accordance with the present invention. The sensing electrode layer 170 is disposed between the first substrate 110 and the common voltage layer 160. The sensing electrode layer 170 includes a plurality of sensing electrode 171 and a plurality of sensing electrode selection switches 173. Each sensing electrode selection switch 173 is connected to at least one sensing electrode 171.

Each of the sensing electrodes 171 can be a polygon, circle, ellipse, star, wedge shape, radiation shape, triangle, pentagon, hexagon, octagon, rectangle, or square. Each sensing electrode 171 is made of material selected from the group consisting of indium tin oxide (ITO), zinc tin oxide thin film, ETO, nano silver, conductive polymer, carbon nanotube, and graphene.

Figure 5:
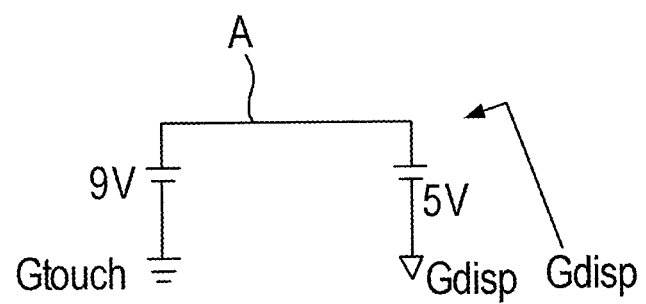
FIG. 5 schematically illustrates the operation principle of the high-sensitivity self-capacitance in-cell touch display panel device in accordance with the present invention.

FIG. 5 schematically illustrates the operation principle of the high-sensitivity self-capacitance in-cell touch display panel device 100 in accordance with the present invention, wherein the grounding of the 5V DC voltage is a first ground (Gdisp) and the grounding of the 9V DC voltage is a second ground (Gtouch). Because the grounding of the 9V DC voltage is the second ground (Gtouch), only 5V can be measured between a node A and the first ground (Gdisp). That is, the 9V DC voltage has no influence to the first ground (Gdisp). Similarly, because the grounding of the 5V DC voltage is the first ground (Gdisp), only 9V can be measured between the node A and the second ground (Gtouch). That is, the 5V DC voltage has no influence to the second ground (Gtouch).

Figure 6:
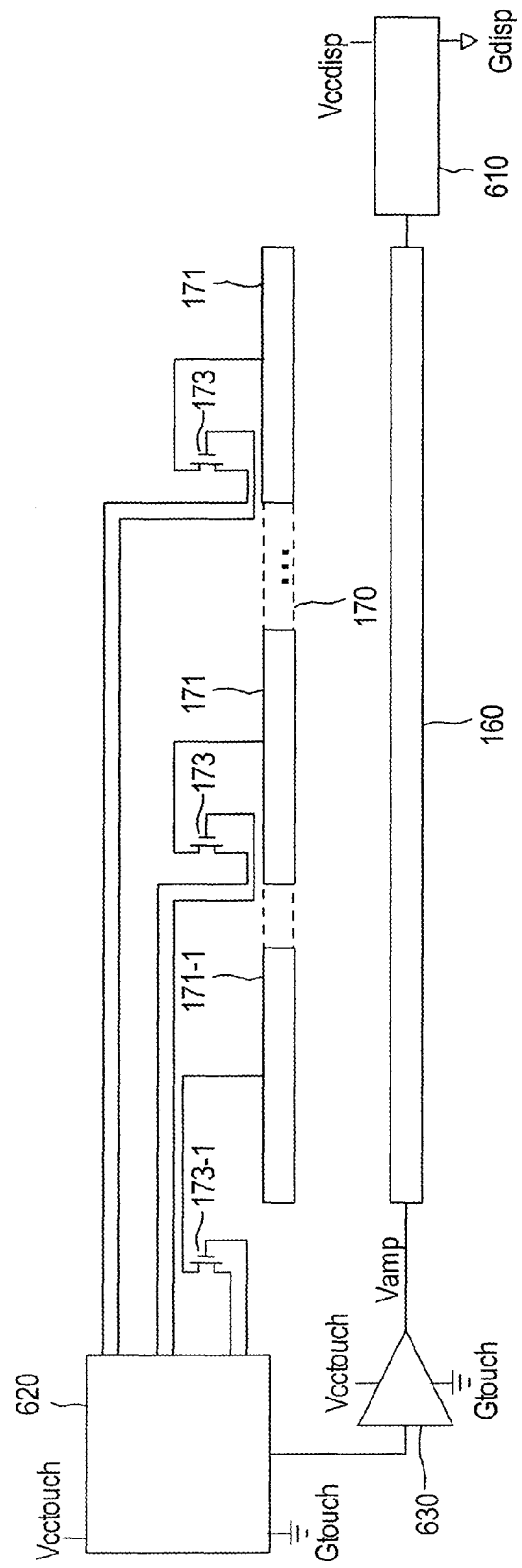
FIG. 6 is a schematic view of the high-sensitivity self-capacitance in-cell touch display panel device in accordance with the present invention.

FIG. 6 is a schematic view of the high-sensitivity self-capacitance in-cell touch display panel device 100 in accordance with the present invention. As shown, a display control circuit 610 is provided to control the display operation of the self-capacitance in-cell touch display panel device 100. The display control circuit 610 is powered by a first power source (Vccdisp) and is connected to the first ground (Gdisp). The display control circuit 610 is connected to the common voltage (Vcom) layer 160. If the common voltage layer 160 is a DC Vcom layer, the display control circuit 610 electrically connects the first ground (Gdisp) to the common voltage layer 160. If the common voltage layer 160 is an AC Vcom layer, the display control circuit 610 outputs an AC signal based on the first ground (Gdisp) to the common voltage layer 160.

With reference to both FIG. 4 and FIG. 6, a touch sensing control circuit 620 is connected to the plurality of sensing electrode selection switches 173 for controlling the at least one sensing electrode 171 corresponding to each sensing electrode selection switch 173 so as to perform a touch sensing. The touch sensing control circuit 620 is powered by a second power source (Vcctouch) and is connected to the second ground (Gtouch). The first power source (Vccdisp) and the first ground (Gdisp) are different from the second power source (Vcctouch) and the second ground (Gtouch); i.e., there is no common current loop therebetween.

An amplifier 630 with gain greater than zero is connected to the touch sensing control circuit 620 and the common voltage layer 160. The amplifier 630 with gain greater than zero is powered by the second power source (Vcctouch) and is connected to the second ground (Gtouch). In performing a touching sensing detection, the touch sensing control circuit 620 applies a sensing signal sensed by a sensing electrode 171-1 corresponding to a sensing electrode selection switch 173-1 to the amplifier 630 with gain greater than zero for being amplified, so as to generate an in-phase copied sensing signal Vamp for being applied to the common voltage layer 160, thereby reducing the capacitance effect between the common voltage layer 160 and the sensing electrode 171-1 corresponding to the sensing electrode selection switch 173-1.

In case that the amplification factor of the amplifier 630 with gain greater than zero is one, the touch sensing control circuit 620 obtains the sensing signal of the sensing electrode 171-1, which is applied to the amplifier 630 with gain greater than zero so as to generate the in-phase copied sensing signal Vamp. The in-phase copied sensing signal Vamp is the same as the sensing signal of the sensing electrode 171-1. That is, the sensing electrode 171-1 and the common voltage layer 160 have the same voltage level. Because the sensing electrode 171-1 and the common voltage layer 160 have the same voltage level, the effective capacitance between the sensing electrode 171-1 and the common voltage layer 160 is zero. Therefore, the present invention is able to effectively decrease the capacitance effect between the sensing electrode 171-1 and the common voltage layer 160.

Figure 7:
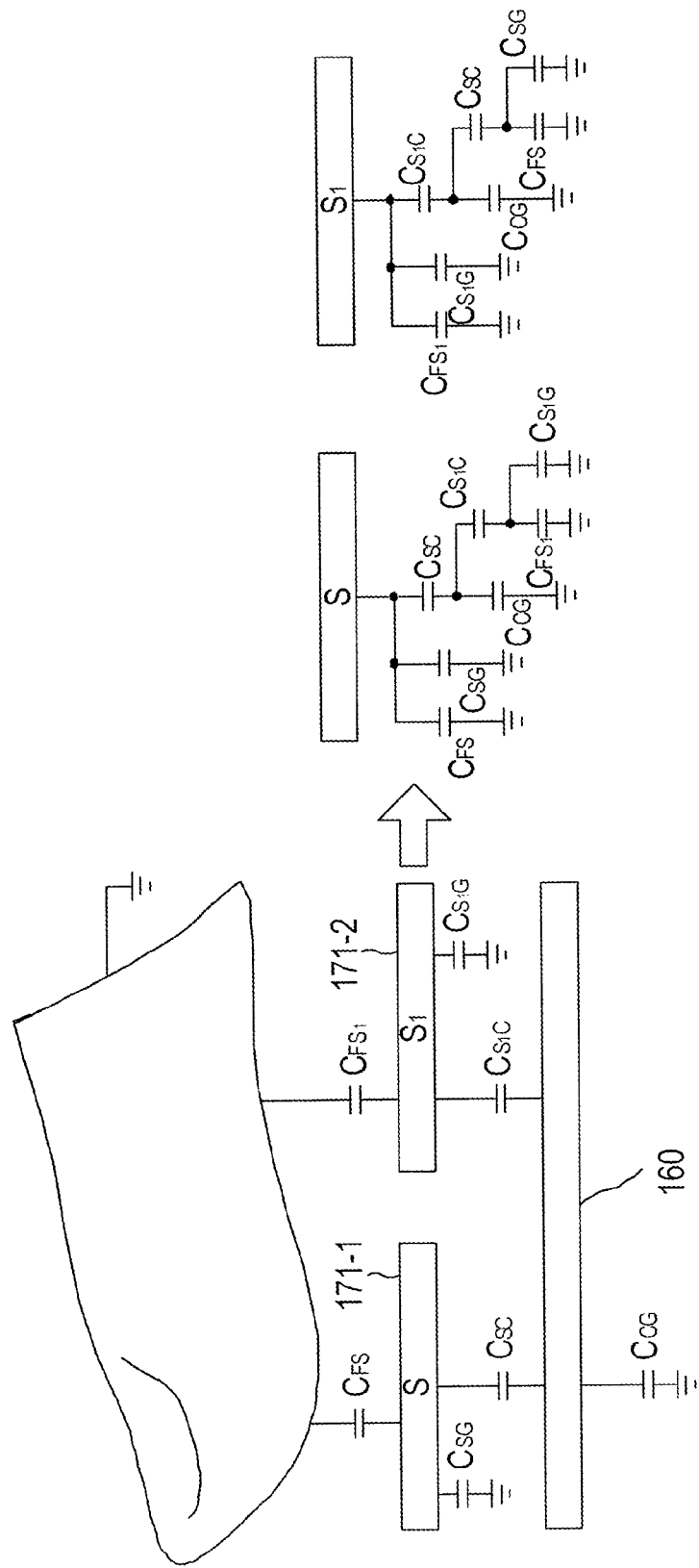
FIG. 7 is an equivalent circuit of a prior self-capacitance in-cell touch display panel device.
Figure 8:
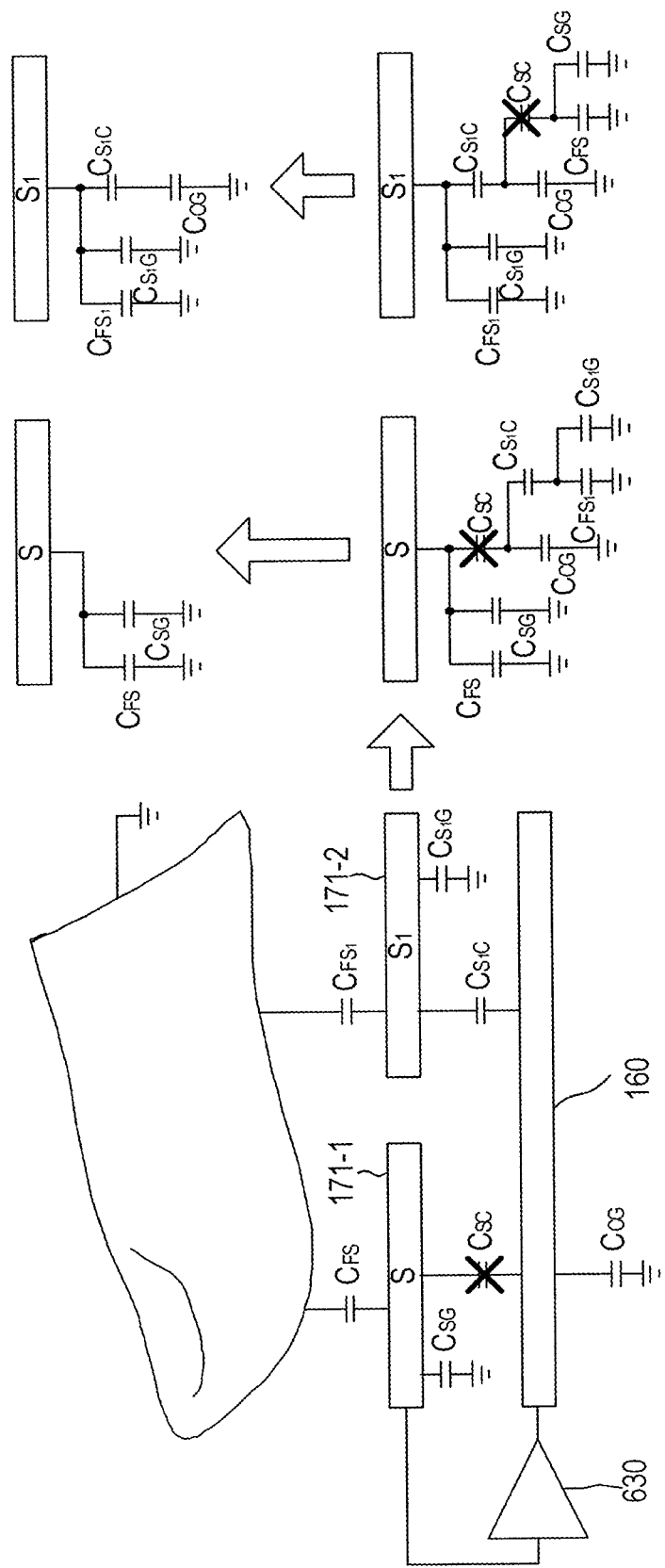
FIG. 8 is an equivalent circuit of the self-capacitance in-cell touch display panel device in accordance with the present invention.

FIG. 7 is an equivalent circuit of a prior self-capacitance in-cell touch display panel device. FIG. 8 is an equivalent circuit of the self-capacitance in-cell touch display panel device in accordance with the present invention for comparison with FIG. 7. As shown in FIG. 8, the gain of the amplifier 630 with gain greater than zero is preferred to be one. The sensing signal on the sensing electrode S is amplified by the amplifier 630 with gain greater than zero for then being applied to the common voltage layer 160, while the sensing electrode S1 is not provided with such technique.

When a finger comes into touch with the sensing electrode S and the sensing electrode S1, the capacitance between the sensing electrode S and the common voltage layer 160 is zero. The capacitance on the sensing electrode S is determined only by the capacitance CFS between the finger and the sensing electrode S and the capacitance CSG between the sensing electrode S and the ground. The capacitance on the sensing electrode S1 is determined by the capacitance CFS1 between the finger and the sensing electrode S1, the capacitance CS1G between the sensing electrode S1 and the ground, the capacitance CS1C between the sensing electrode S1 and the common voltage layer 160, and the capacitance CCG between the common voltage layer 160 and the ground. From FIG. 8, it is known that the capacitance CFS between the finger and the sensing electrode S is the major component of the sensing signal, and thus, in comparison with the prior art, the present invention is able to more accurately detect the touch position and also reduce the capacitance effect between the sensing electrode and the common voltage layer 160.

With reference to FIG. 2 again, the color filter layer 150 is disposed at one side of the black matrix layer 140 that faces the display material layer 130.

The thin film transistor layer 180 is disposed at one side of the second substrate 120 that faces the display material layer 130, and includes K gate lines and L source lines, wherein K, L are each a positive integer, and the gates lines and source lines are well-known to those skilled in the typical LCD device and thus are not shown in the figure. The K gate lines are arranged in the first direction, and the L source lines are arranged in the second direction, so as to form a plurality of pixel blocks. Each pixel block has a pixel transistor and a capacitor corresponding thereto, so as to drive the corresponding pixel transistor and capacitor according to a display pixel signal and a display driving signal thereby performing, a display operation. The plurality of opaque lines 141 are disposed at positions corresponding to those of the K gate lines and L source lines.

The first polarizer layer 190 is disposed at one side the first substrate 110 opposite to the other side of the first substrate 110 facing the display material layer 130. The second polarizer layer 200 is disposed at one side of the second substrate 120 opposite to the other side of the second substrate 120 facing the display material layer 130.

Figure 9:
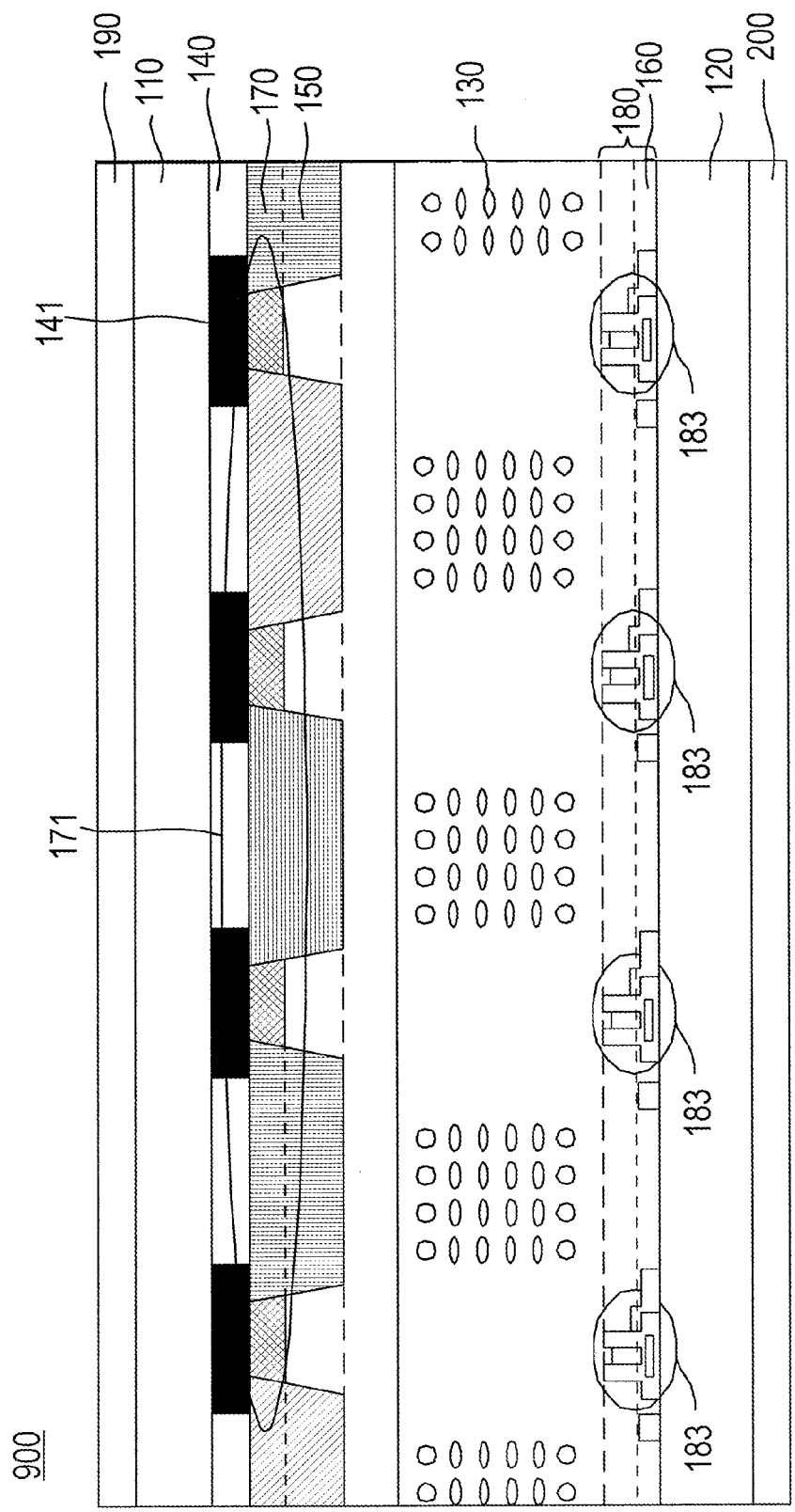
FIG. 9 is a stacked diagram of the high-sensitivity self-capacitance in-cell touch display panel device in accordance with another embodiment of the present invention.

FIG. 9 is a stacked diagram of the high-sensitivity self-capacitance in-cell touch display panel device 900 in accordance with another embodiment of the present invention. As shown, the high-sensitivity self-capacitance in-cell touch display panel device 900 includes a first substrate 110, a second substrate 120, a display material layer 130, a black matrix layer 140, a color filter layer 150, a sensing electrode layer 170, a thin film transistor layer 180, a first polarizer layer 190, and a second polarizer layer 200. This embodiment is similar to that of FIG. 2 except that: the sensing electrode layer 170 is disposed at one side of the black matrix layer 140 facing the display material layer 130 and the sensing electrode layer 170 includes a plurality of sensing electrodes, each sensing electrode being formed by metal mesh. That is, the plurality of sensing electrodes 171 are disposed at one side of the black matrix layer 140 facing the display material layer 130, and the common voltage layer 160 is disposed in the thin film transistor layer 180. The material of the metal mash is selected from the group consisting of chromium, barium, molybdenum, aluminum, silver, copper, titanium, nickel, tantalum, cobalt, tungsten, magnesium (Mg), calcium (Ca), potassium (K), lithium (Li), indium (In), an alloy thereof, fluorine lithium (LiF), magnesium fluoride ($MgF_2$), and lithium oxide ($Li_2O$).

The technique for the sensing electrode 171 formed by metal mesh has been described in detail in US patent Publication No. 20150049264, 20150085208, 20140192275, 20130314371, 20140375911, 20130314371, 20140346493, 20140353691 and 20140326967 filed by the same applicant. The common voltage layer 160 being disposed in the thin film transistor layer 180 indicates that the panel is an IPS type LCD panel.

The black matrix layer 140 is between the first substrate 110 and the display material layer 130 and is disposed at one side of the first substrate 110 that faces the display material layer 130. The black matrix layer 140 is composed of a plurality of opaque lines 141 arranged in a first direction and a second direction for defining a plurality of light-penetrating blocks.

The color filter layer 150 is disposed at one side of the black matrix layer 140 that faces the display material layer 130. The first polarizer layer 190 is disposed at one side the first substrate 110 opposite to the other side of the first substrate 110 facing the display material layer 130. The thin film transistor layer 180 is disposed at one side of the second substrate 120 that faces the display material layer 130, and includes K gate lines and L source lines, wherein K, L are each a positive integer, and the gates lines and source lines are well-known to those skilled in the typical LCD device and thus are not shown in the figure. The K gate lines are arranged in the first direction, and the L source lines are arranged in the second direction, so as to form a plurality of pixel blocks. Each pixel block has a pixel transistor and a capacitor corresponding thereto, so as to drive the corresponding pixel transistor and capacitor according to a display pixel signal and a display driving signal thereby performing a display operation. The second polarizer layer 200 is disposed at one side of the second substrate 120 opposite to the other side of the second substrate 120 facing the display material layer 130.

The plurality of opaque lines 141 are disposed at positions corresponding to those of the K gate lines and L source lines. The sensing electrodes formed by metal mesh are disposed at positions corresponding to those of the plurality of opaque lines 141.

In other embodiments, the sensing electrode layer 170 is disposed in the thin film transistor layer 180; i.e., the plurality of sensing electrodes is disposed in the thin film transistor layer 180. The technique for forming metal mesh type sensing electrodes in the thin film transistor layer 180 or forming metal mesh type sensing electrodes on the first substrate 110 has been described in detail in US patent Publication No. 20150049264, 20150085208, 20140192275, 20130314371, 20140375911, 20130314371, 20140346493, 20140353691 and 20140326967 filed by the same applicant.

Figure 10:
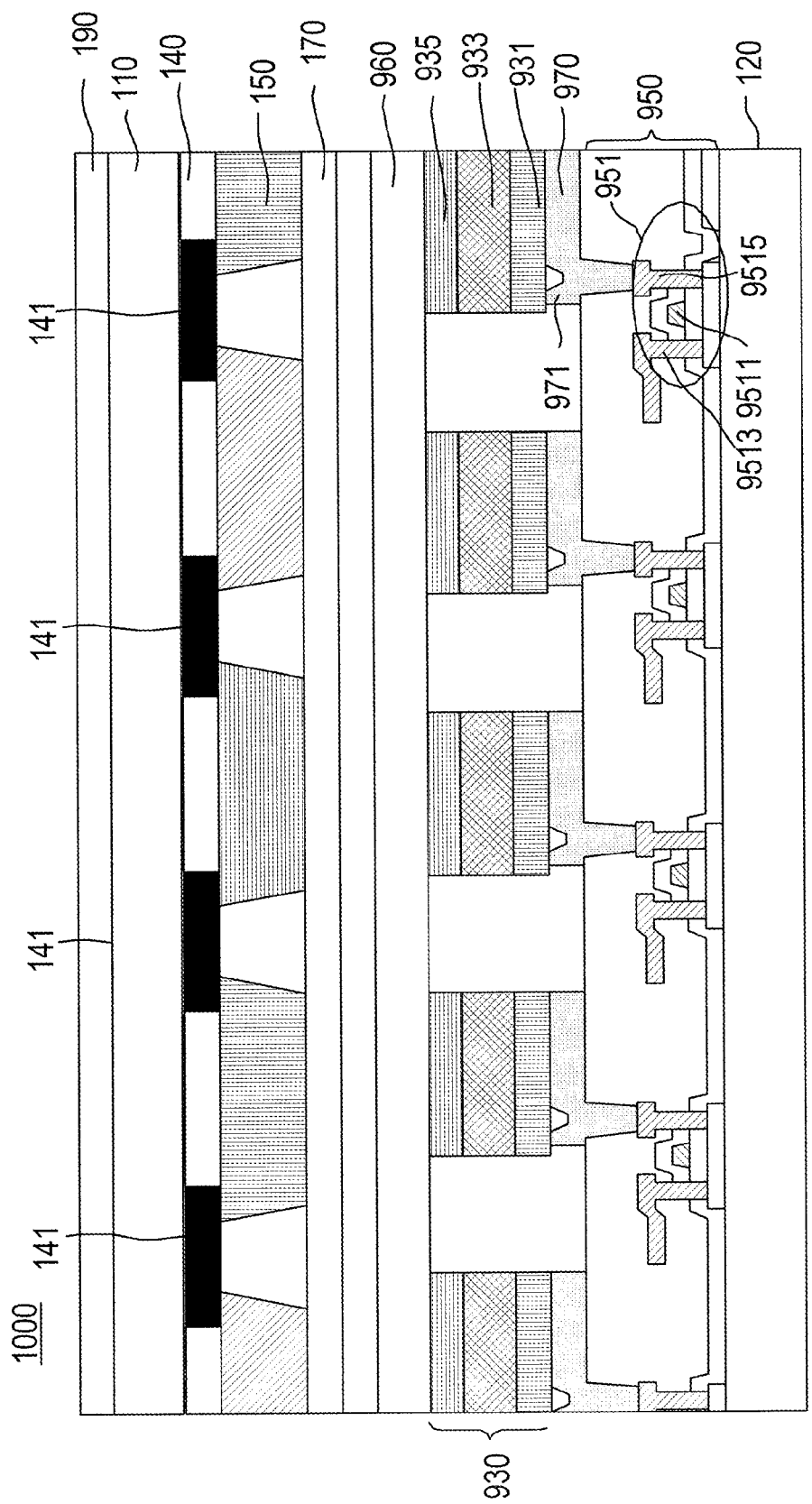
FIG. 10 is a stacked diagram of the high-sensitivity self-capacitance in-cell touch display panel device in accordance with still another embodiment of the present invention.

FIG. 10 is a stacked diagram of the high-sensitivity self-capacitance in-cell touch display panel device 1000 in accordance with still another embodiment of the present invention. As shown, the high-sensitivity self-capacitance in-cell touch display panel device 1000 is similar to those of FIG. 2 and FIG. 6 except for the display material layer 930, the cathode layer 960, the anode layer 970 and the thin film transistor layer 950, and the output of the amplifier 630 with gain greater than zero being connected to the cathode layer 960. In performing a touch sensing detection, the touch sensing control circuit 620 applies a sensing signal sensed by at least a sensing electrode corresponding to a sensing electrode selection switch to the amplifier with gain greater than zero for being amplified, so as to generate an in-phase copied sensing signal for being applied to the cathode 960, thereby reducing the capacitance effect between the cathode layer 960 and the at least one sensing electrode corresponding to the sensing electrode selection switch. In this embodiment, the display material layer 930 is an organic light emitting diode layer.

The cathode layer 960 is disposed at one side of the first substrate 110 facing the display material layer 930 and between the first substrate 110 and the display material layer 930. The cathode layer 960 is made of metal material, preferably metal material with thickness being less than 50 nm. The metal material is selected from the group consisting of: aluminum (Al), silver (Ag), magnesium (Mg), calcium (Ca), potassium (K), lithium (Li), indium (In), alloy thereof or mixture of lithium fluoride (LiF), magnesium fluoride ($MgF_2$), lithium oxide ($Li_2O$) and aluminum. Due to the thickness of the cathode layer 960 being less than 50 nm, the light generated by the display material layer 930 can pass through the cathode layer 960, so as to show images on the first substrate 110. The cathode layer 960 is electrically connected in the whole piece. The cathode layer 960 receives the current coming from the anode pixel electrode 971.

The color filter layer 150 is disposed at one side of the black matrix layer 140 that faces the display material layer 130.

The thin film transistor layer 950 is disposed at one side of the second substrate 120 that faces the display material layer 930, and includes a plurality of gate lines (not shown), a plurality of source lines (not shown), and a plurality pixel driving circuits 951. Each pixel driving circuit 951 is corresponding to a pixel, so as to drive the corresponding pixel driving circuit 951 according to a display pixel signal and a display driving signal thereby performing a display operation. The plurality of gate lines and the plurality c of source lines define a plurality of pixel areas, each corresponding to alight penetrating block 143.

According to different designs of driving circuit 95 (such as 2T1C, is formed with two thin film transistors and a storage capacitor, and 6T2C is formed with six thin film transistors and two storage capacitors), a gate 9511 of at least one thin film transistor in the pixel driving circuit 951 is connected to a gate line (not shown). According to different designs of driving circuit, a source/drain 9513 of at least one thin film transistor in the control circuit is connected to a source line (not shown) and a source/drain 9515 of at least one thin film transistor in pixel driving circuit 951 is connected to a corresponding anode pixel electrode 971 of the anode layer 970.

The anode layer 970 is disposed at one site of the thin film transistor layer 950 facing the display material layer 930 and includes a plurality of anode pixel electrodes 971. Each of the anode pixel electrodes 971 is corresponding to one of the pixel driving transistors 951 of the thin film transistor layer 950. That is, each of the anode pixel electrodes is connected to a source/drain of the corresponding pixel driving transistor 951, so as to form a pixel electrode of a specific color, for example a red pixel electrode, a green pixel electrode, or a blue pixel electrode.

The display material layer 930 includes a hole transporting layer 931 an emitting layer 933, and an electron transporting layer 935. The display material layer 930 preferably generates white light, which is filtered to generate three primary colors of red, blue and green by using the color filter 150.

Figure 11:
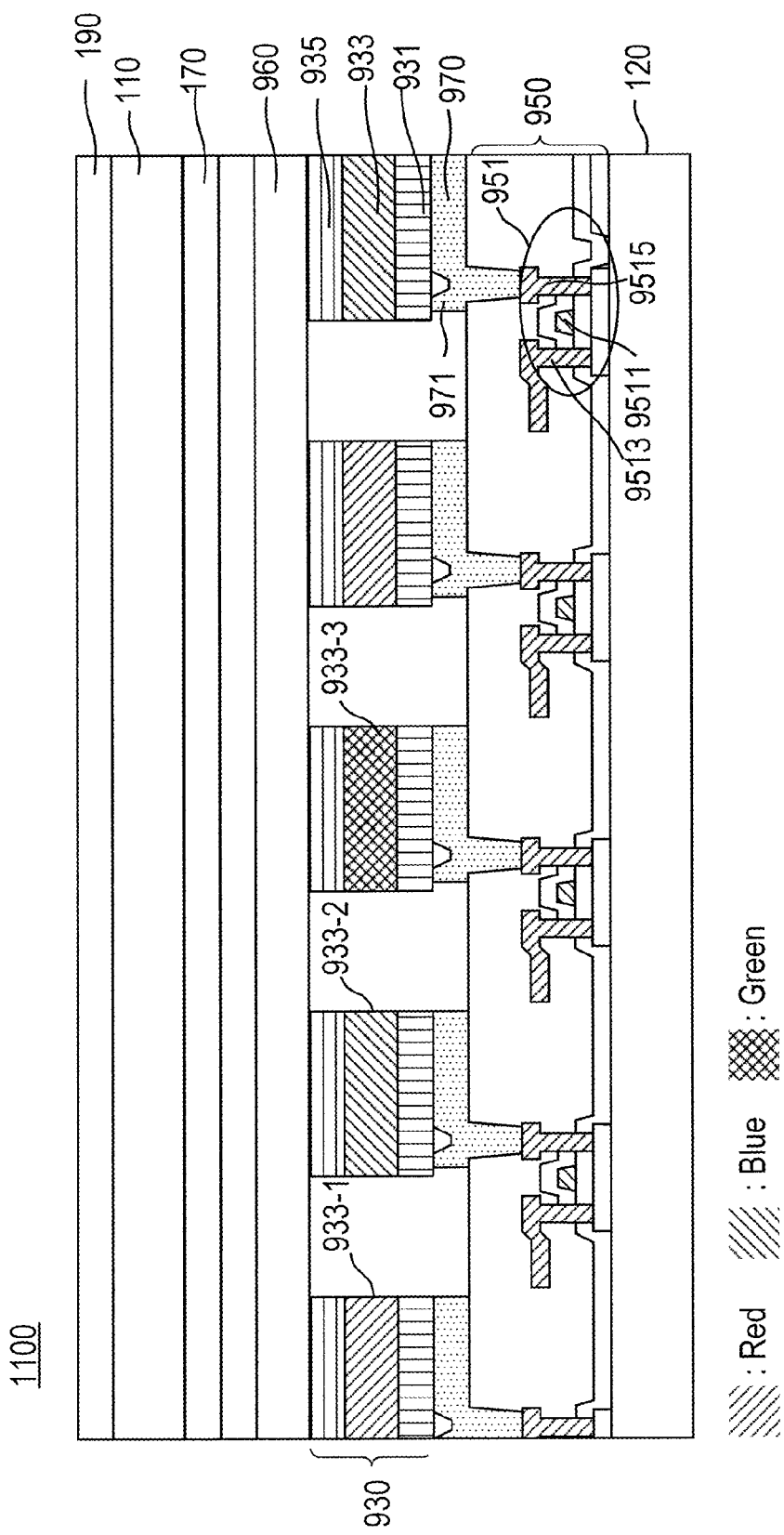
FIG. 11 is a stacked diagram of the high-sensitivity self-capacitance in-cell touch display panel device in accordance with yet another embodiment of the present invention.

FIG. 11 is a stacked diagram of the high-sensitivity self-capacitance in-cell touch display panel device 1100 in accordance with yet another embodiment of the present invention. As shown, the high-sensitivity self-capacitance in-cell touch display panel device 1100 is similar to that of FIG. 10 except that: a red emitting layer 933-1, a blue emitting layer 933-2 and a green emitting layer 933-3 are provided in FIG. 11 so that there is no need to use a color filter layer and a black matrix layer.

Figure 12:
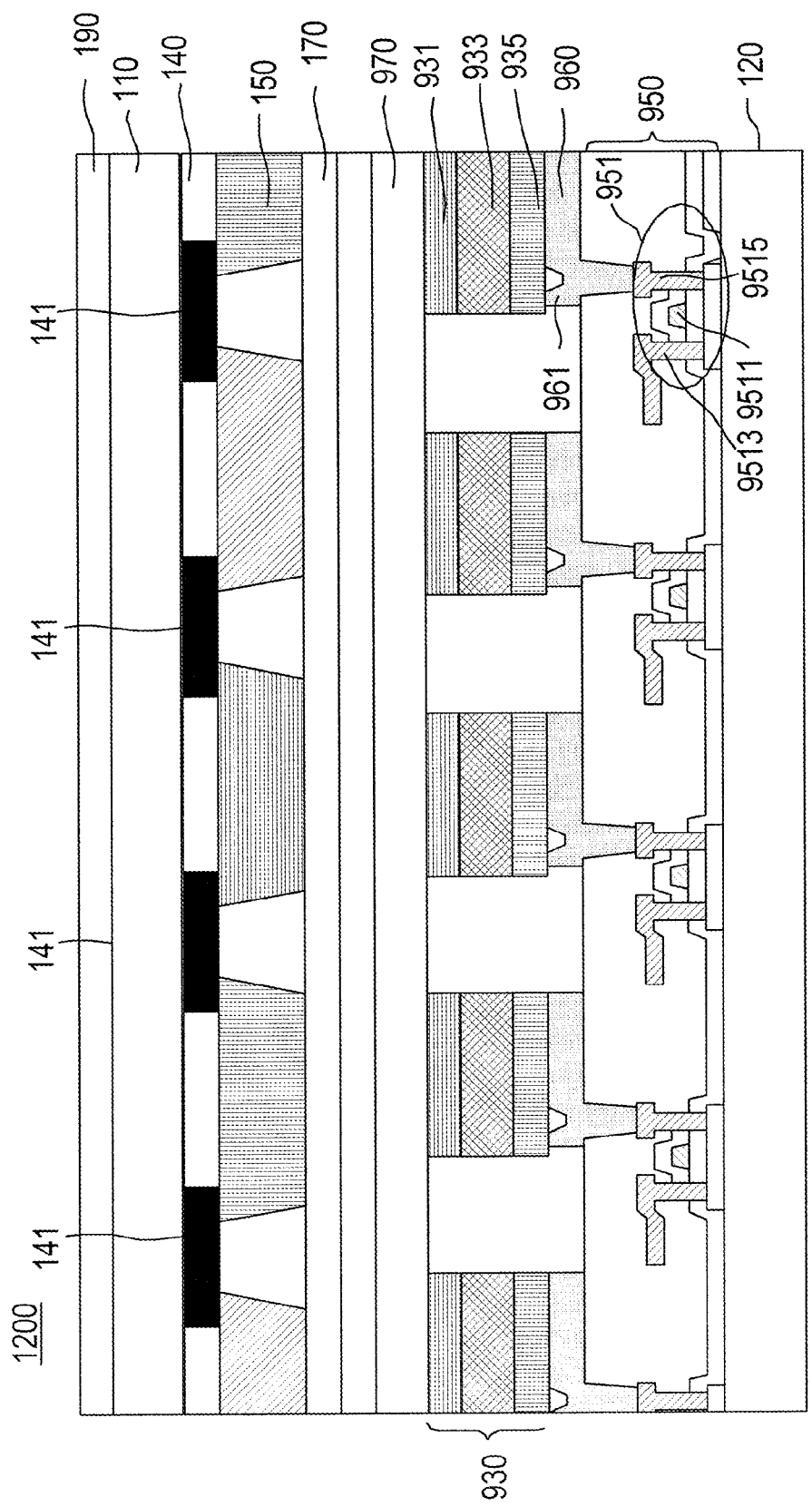
FIG. 12 is a stacked diagram of the high-sensitivity self-capacitance in-cell touch display panel device in accordance with further another embodiment of the present invention.

FIG. 12 is a stacked diagram of the high-sensitivity self-capacitance in-cell touch display panel device 1200 in accordance with further another embodiment of the present invention. As shown, the high-sensitivity self-capacitance in-cell touch display panel device 1200 is similar to that of FIG. 10 except that the positions of the cathode layer 960 and the anode layer 970 are exchanged with each other. The cathode layer 960 includes a plurality of cathode pixel electrodes 961, each corresponding to one pixel driving transistor of the pixel driving circuit 9511 of the thin film transistor layer 950. That is, each of the cathode pixel electrodes is connected to a source/drain 9515 of the pixel driving transistor of the corresponding pixel driving circuit 951, so as to form a pixel electrode of a specific color, for example a red pixel electrode, a green pixel electrode, or a blue pixel electrode.

In FIG. 12, corresponding to the exchange of the positions of the cathode layer 960 and the anode layer 970, the positions of the hole transporting layer 931 and the electron transporting layer 935 of the display material layer 930 are also exchanged with each other. The cathode layer 960 includes a plurality of cathode pixel electrodes 961. Each of the cathode pixel electrodes 961 is connected to a source/drain of the pixel driving transistor of the corresponding pixel driving circuit.

In this embodiment, the output of the amplifier 630 with gain greater than zero is connected to the anode layer 970. In performing a touch sensing detection, the touch sensing control circuit applies a sensing signal sensed by at least one sensing electrode corresponding to a sensing electrode selection switch to the amplifier with gain greater than zero for being amplified, so as to generate an in-phase copied sensing signal for being applied to the anode 970, thereby reducing the capacitance effect between the anode layer 970 and the at least one sensing electrode corresponding to the sensing electrode selection switch.

Figure 13:
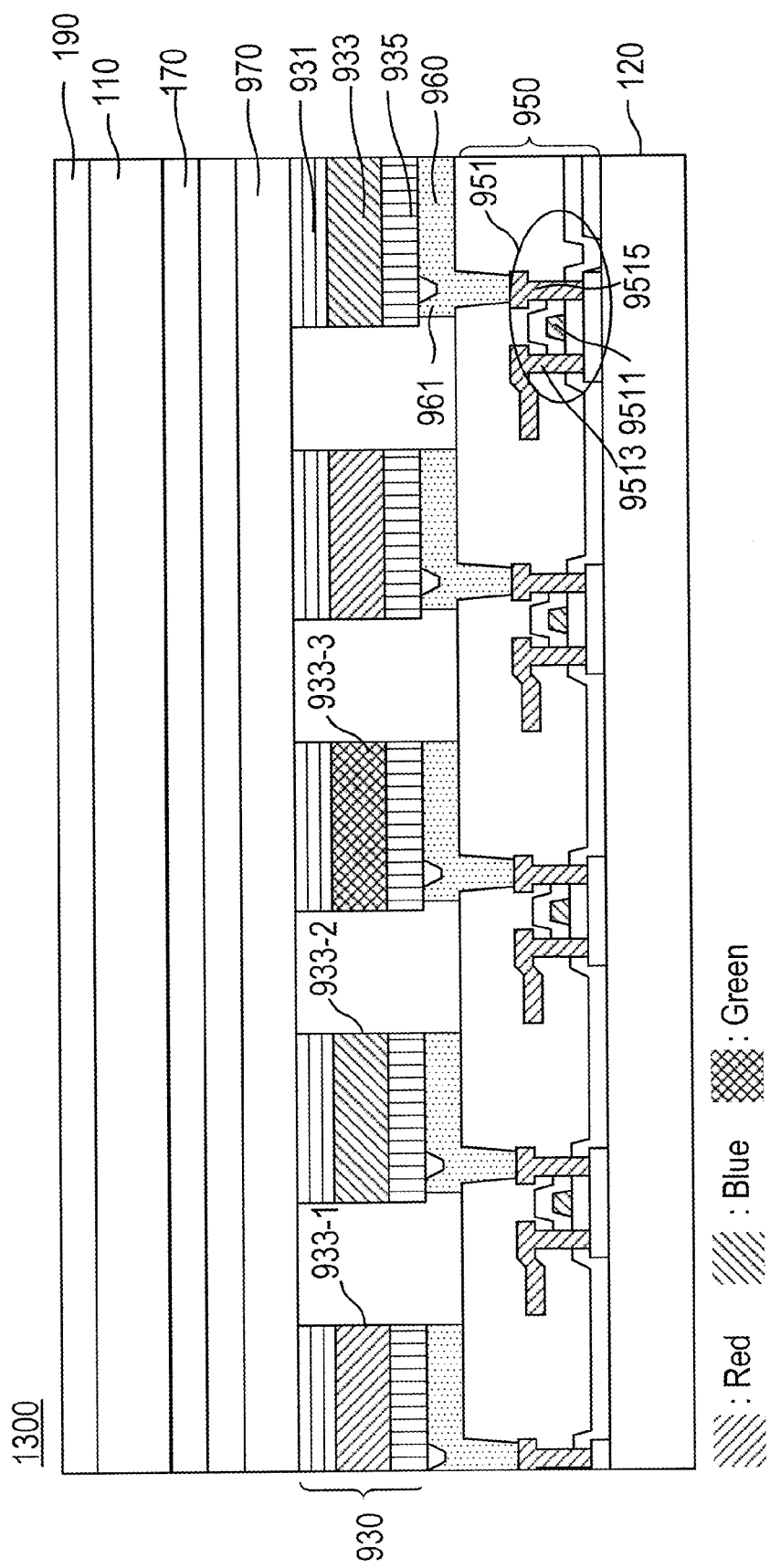
FIG. 13 is a stacked diagram of the high-sensitivity self-capacitance in-cell touch display panel device in accordance with still further another embodiment of the present invention.

FIG. 13 is a stacked diagram of the high-sensitivity self-capacitance in-cell touch display panel device 1300 in accordance with still further another embodiment of the present invention. As shown, the high-sensitivity self-capacitance in-cell touch display panel device 1300 is similar to that of FIG. 12 except that: a red emitting layer 933-1, a blue emitting layer 933-2 and a green emitting layer 933-3 are provided in FIG. 11 so that there is no need to use a color filter layer and a black matrix layer.

In view of the foregoing, it is known that, in detecting a finger's touch, the sensing signal of a sensing electrode 171-1 is amplified by the amplifier 630 with gain greater than zero to generate the in-phase copied sensing signal Vamp, and the in-phase copied sensing signal Vamp is applied to the common voltage layer 160, so that the sensing electrode 171-1 and the common voltage layer 160 have the same voltage level and thus the capacitance between the sensing electrode 171-1 and the common voltage layer 160 is zero. The capacitance between the finger and sensing electrode is the major component of the sensing signal, and thus, in comparison with the prior art, the present invention is able to more accurately detect the touch position. Furthermore, in order to prevent the display panel from being interfered by the in-phase copied sensing signal Vamp applied to the common voltage layer 160, the power source and the ground fir the display control circuit 610 are different from those for the touch sensing control circuit 620 and the amplifier 630 with gain greater than zero, thereby increasing the accuracy in detecting the touch position without interfering with the display quality.

In other embodiments, the sensing electrode layer 170 can be formed in the thin film transistor layer 950 or on one side of the first substrate by metal mesh. Such technique has been described in detail in US patent Publication No. 20150049264, 20150085208, 20140192275, 20130314371, 20140375911, 20130314371, 20140346493, 20140353691 and 20140326967 filed by the same applicant.

Although the present invention has been explained in relation to its preferred embodiment, it is to be understood that man other possible modifications and variations can be made without departing from the spirit and scope of the invention as hereinafter claimed.

What is claimed is:

1. A high-sensitivity self-capacitance in-cell touch display panel device, comprising:
   a first substrate;
   a second substrate parallel to the first substrate;
   a display material layer configured between the first substrate and the second substrate;
   a common voltage layer disposed between the first substrate and the display material layer;
   a sensing electrode layer disposed between the first substrate and the common voltage layer, and having a plurality of sensing electrodes;
   a plurality of sensing electrode selection switches, each corresponding to exactly one of the sensing electrodes;
   a display control circuit for controlling the high-sensitivity self-capacitance in-cell touch display panel device to display an image wherein the display control circuit is powered by a first power source and is connected to a first ground;
   a touch sensing control circuit connected to the plurality of sensing electrode selection switches for controlling each of the sensing electrodes to perform a self-capacitance touch sensing, wherein the touch sensing control circuit is powered by a second power source and is connected to a second ground; and
   an amplifier with gain greater than zero connected to the touch sensing control circuit and the common voltage layer, wherein the first power source and the first ground are different from the second power source and the second ground, and
   wherein in detection of a touch position a sensing signal from a sensing electrode of the plurality of sensing electrodes is applied to the common voltage layer through the amplifier by the touch sensing control circuit so as to reduce a capacitance between the sensing electrode and the common voltage layer.

2. The high-sensitivity self-capacitance in-cell touch display panel device as claimed in claim 1, further comprising:
   a black matrix layer disposed at one side of the first substrate facing the display material layer, the black matrix layer being composed of a plurality of opaque lines arranged in a first direction and a second direction thereby defining a plurality of light-penetrating blocks, wherein the first direction is perpendicular to the second direction;
   a color filter layer disposed at one side of black matrix layer facing the display material layer;
   a first polarizer layer disposed at one side the first substrate opposite to the other side of the first substrate facing the display material layer;
   a thin film transistor layer disposed at the side of the second substrate facing the display material layer, and including K gate lines and L source lines, where K and L are each a positive integer, the K gate lines being arranged in the first direction and the L source lines being arranged in the second direction for forming a plurality of pixel blocks, each pixel block having a pixel transistor and a capacitor corresponding thereto, so as to drive the corresponding pixel transistor and capacitor according to a display pixel signal and a display driving signal thereby performing a display operation; and
   a second polarizer layer disposed at one side of the second substrate opposite to the other side of the second substrate facing the display material layer,
   wherein the plurality of opaque lines is disposed at positions corresponding to those of the K gate lines and L source lines.

3. The high-sensitivity self-capacitance in-cell touch display panel device as claimed in claim 2, wherein each of the sensing electrodes is a polygon, circle, ellipse, star, wedge shape, radiation shape, triangle, pentagon, hexagon, octagon, rectangle, or square.

4. The high-sensitivity self-capacitance in-cell touch display panel device as claimed in claim 3, wherein each of the sensing electrodes is made of material selected from the group consisting of indium tin oxide, zinc tin oxide thin film, ETO, nano silver, conductive polymer, carbon nanotube, and graphene.

5. A high-sensitivity self-capacitance in-cell touch display panel device, comprising:
   a first substrate;
   a common voltage layer;
   a second substrate parallel to the first substrate;
   a display material layer configured between the first substrate and the second substrate;
   a plurality of sensing electrodes, each formed by metal mesh;
   a plurality of sensing electrode selection switches, each corresponding to exactly one of the sensing electrodes;
   a display control circuit for controlling the high-sensitivity self-capacitance in-cell touch display panel device to display an image, wherein the display control circuit is powered by a first power source and is connected to a first ground;
   a touch sensing control circuit connected to the plurality of sensing electrode selection switches for controlling each of the sensing electrodes to perform a self-capacitance touch sensing, wherein the touch sensing control circuit is powered by a second power source and is connected to a second ground; and
   an amplifier with gain greater than zero connected to the touch sensing control circuit and the common voltage layer,
   wherein the first power source and the first ground are different from the second power source and the second ground, and
   in detection of a touch position, a sensing signal from a sensing electrode of the plurality of sensing electrodes is applied to the common voltage layer through the amplifier by the touch sensing control circuit so as to reduce a capacitance between the sensing electrode and the common voltage layer.

6. The high-sensitivity self-capacitance in-cell touch display panel device as claimed in claim 5, further comprising:
   a black matrix layer disposed at one side of the first substrate facing the display material layer, the black matrix layer being composed of a plurality of opaque lines arranged in a first direction and a second direction thereby defining a plurality of light-penetrating blocks, wherein the first direction is perpendicular to the second direction;
   a color filter layer disposed at one side of black matrix layer facing the display material layer;

a first polarizer layer disposed at one side the first substrate opposite to the other side of the first substrate facing the display material layer;

a thin film transistor layer disposed at the side of the second substrate facing the display material layer, and including K gate lines and L source lines, where K and L are each a positive integer, the K gate lines being arranged in the first direction and the L source lines being arranged in the second direction for forming a plurality of pixel blocks, each pixel block having a pixel transistor and a capacitor corresponding thereto, so as to drive the corresponding pixel transistor and capacitor according to a display pixel signal and a display driving signal thereby performing a display operation; and a second polarizer layer disposed at one side of the second substrate opposite to the other side of the second substrate facing the display material layer.

7. The high-sensitivity self-capacitance in-cell touch display panel device as claimed in claim 6, wherein the plurality of opaque lines is disposed at positions corresponding to those of the K gate lines and L source lines.

8. The high-sensitivity self-capacitance in-cell touch display panel device as claimed in claim 7, wherein each sensing electrode formed by metal mesh is a polygon, circle, ellipse, star, wedge shape, radiation shape, triangle, pentagon, hexagon, octagon, rectangle, or square.

9. The high-sensitivity self-capacitance in-cell touch display panel device as claimed in claim 8, wherein each sensing electrode formed by metal mesh is made of material selected from the group consisting of chromium, barium, molybdenum, aluminum, silver, copper, titanium, nickel, tantalum, cobalt, tungsten, magnesium, calcium, potassium, lithium, indium, an alloy thereof, fluorine lithium, magnesium fluoride, and lithium oxide.

10. The high-sensitivity self-capacitance in-cell touch display panel device as claimed in claim 9, wherein the plurality of sensing electrodes is disposed at one side of the black matrix layer facing the display material layer.

11. The high-sensitivity self-capacitance in-cell touch display panel device as claimed in claim 9, wherein the plurality of sensing electrodes is disposed in the thin film transistor layer.

12. A high-sensitivity self-capacitance in-cell touch display panel device, comprising:
a first substrate;
a second substrate parallel to the first substrate;
a display material layer configured between the first substrate and the second substrate;
a cathode layer disposed at one side of the first substrate facing the display material;
a sensing electrode layer disposed between the first substrate and the second substrate, and having a plurality of sensing electrodes;
a plurality of sensing electrode selection switches, each corresponding to exactly one of the sensing electrodes;
a display control circuit for controlling the high-sensitivity self-capacitance in-cell touch display panel device to display an image, wherein the display control circuit is powered by a first power source and is connected to a first ground;
a touch sensing control circuit connected to the plurality of sensing electrode selection switches for controlling each of the sensing electrodes to perform a self-capacitance touch sensing, wherein the touch sensing control circuit is powered by a second power source and is connected to a second ground; and
an amplifier with gain greater than zero connected to the touch sensing control circuit and the cathode layer,
wherein the first power source and the first ground are different from the second power source and the second ground, and
in detection of a touch position, a sensing signal from a sensing electrode of the plurality of sensing electrodes is applied to the cathode layer through the amplifier by the touch sensing control circuit so as to reduce a capacitance between the sensing electrode and the cathode layer.

13. The high-sensitivity self-capacitance in-cell touch display panel device as claimed in claim 12, further comprising:
a thin film transistor layer disposed at one side of the second substrate facing the display material layer, and including K gate lines and L source lines, where K and L are each a positive integer, the K gate lines being arranged in a first direction and the L source lines being arranged in a second direction for forming a plurality of pixel blocks, each pixel block having a pixel transistor and a capacitor corresponding thereto, so as to drive the corresponding pixel transistor and capacitor according to a display pixel signal and a display driving signal thereby performing a display operation, wherein the first direction is perpendicular to the second direction.

14. The high-sensitivity self-capacitance in-cell touch display panel device as claimed in claim 13, further comprising:
a black matrix layer disposed at one side of the first substrate facing the display material layer, the black matrix layer being composed of a plurality of opaque lines arranged in the first direction and the second direction thereby defining a plurality of light-penetrating blocks; and
a color filter layer disposed at one side of black matrix layer facing the display material layer,
wherein the plurality of opaque lines is disposed at positions corresponding to those of the K gate lines and L source lines.

15. The high-sensitivity self-capacitance in-cell touch display panel device as claimed in claim 13, wherein each of the sensing electrodes is a polygon, circle, ellipse, star, wedge shape, radiation shape, triangle, pentagon, hexagon, octagon, rectangle, or square.

16. The high-sensitivity self-capacitance in-cell touch display panel device as claimed in claim 15, wherein each of the sensing electrodes is made of material selected from the group consisting of indium tin oxide, zinc tin oxide thin film, ETO, nano silver, conductive polymer, carbon nanotube, and graphene.

17. The high-sensitivity self-capacitance in-cell touch display panel device as claimed in claim 15, wherein each sensing electrode is formed by metal mesh.

18. The high-sensitivity self-capacitance in-cell touch display panel device as claimed in claim 17, wherein each sensing electrode formed by metal mesh is made of material selected from the group consisting of chromium, barium, molybdenum, aluminum, silver, copper, titanium, nickel, tantalum, cobalt, tungsten, magnesium, calcium, potassium, lithium, indium, an alloy thereof, fluorine lithium, magnesium fluoride, and lithium oxide.

19. The high-sensitivity self-capacitance in-cell touch display panel device as claimed in claim 18, wherein the plurality of sensing electrodes is disposed at one side of the black matrix layer facing the display material layer.

20. The high-sensitivity self-capacitance in-cell touch display panel device as claimed in claim 18, wherein the plurality of sensing electrodes is disposed in the thin film transistor layer.

21. A high-sensitivity self-capacitance in-cell touch display panel device, comprising:
a first substrate;
a second substrate parallel to the first substrate;
a display material layer configured between the first substrate and the second substrate; an anode layer disposed at one side of the first substrate facing the display material;
a sensing electrode layer disposed between the first substrate and the second substrate, and having a plurality of sensing electrodes;
a plurality of sensing electrode selection switches, each corresponding to exactly one of the sensing electrodes;
a display control circuit for controlling the high-sensitivity self-capacitance in-cell touch display panel device to display an image, wherein the display control circuit is powered by a first power source and is connected to a first ground;
a touch sensing control circuit connected to the plurality of sensing electrode selection switches for controlling each of the sensing electrodes to perform a self-capacitance touch sensing, wherein the touch sensing control circuit is powered by a second power source and is connected to a second ground; and
an amplifier with gain greater than zero connected to the touch sensing control circuit and the anode layer,
wherein the first power source and the first ground are different from the second power source and the second ground, and
in detection of a touch position a sensing signal from a sensing electrode of the plurality of sensing electrodes is applied to the anode layer through the amplifier by the touch sensing control circuit so as to reduce a capacitance between the sensing electrode and the anode layer.

22. The high-sensitivity self-capacitance in-cell touch display panel device as claimed in claim 21, further comprising:
a thin film transistor layer disposed at one side of the second substrate facing the display material layer, and including K gate lines and L source lines, where K and L are each a positive integer, the K gate lines being arranged in a first direction and the L source lines being arranged in a second direction for forming a plurality of pixel blocks, each pixel block having a pixel transistor and a capacitor corresponding thereto, so as to drive the corresponding pixel transistor and capacitor according to a display pixel signal and a display driving signal thereby performing a display operation, wherein the first direction is perpendicular to the second direction.

23. The high-sensitivity self-capacitance in-cell touch display panel device as claimed in claim 22, further comprising:
a black matrix layer disposed at one side of the first substrate facing the display material layer, the black matrix layer being composed of a plurality of opaque lines arranged in the first direction and the second direction thereby defining a plurality of light-penetrating blocks; and
a color filter layer disposed at one side of black matrix layer facing the display material layer,
wherein the plurality of opaque lines is disposed at positions corresponding to those of the K gate lines and L source lines.

24. The high-sensitivity self-capacitance in-cell touch display panel device as claimed in claim 22, wherein each of the sensing electrodes is a polygon, circle, ellipse, star, wedge shape, radiation shape, triangle, pentagon, hexagon, octagon, rectangle, or square.

25. The high-sensitivity self-capacitance in-cell touch display panel device as claimed in claim 24, wherein each of the sensing electrodes is made of material selected from the group consisting of indium tin oxide, zinc tin oxide thin film, ETO, nano silver, conductive polymer, carbon nanotube, and graphene.

26. The high-sensitivity self-capacitance in-cell touch display panel device as claimed in claim 24, wherein each sensing electrode is formed by metal mesh.

27. The high-sensitivity self-capacitance in-cell touch display panel device as claimed in claim 26, wherein each sensing electrode formed by metal mesh is made of material selected from the group consisting of chromium, barium, molybdenum, aluminum, silver, copper, titanium, nickel, tantalum, cobalt, tungsten, magnesium, calcium, potassium, lithium, indium, an alloy thereof, fluorine lithium, magnesium fluoride, and lithium oxide.

28. The high-sensitivity self-capacitance in-cell touch display panel device as claimed in claim 27, wherein the plurality of sensing electrodes is disposed at one side of the black matrix layer facing the display material layer.

29. The high-sensitivity self-capacitance in-cell touch display panel device as claimed in claim 27, wherein the plurality of sensing electrodes is disposed in the thin film transistor layer.

* * * * *